6767X
B. MYERS.
Millstone Dress.
Patented Sept. 28, 1831.
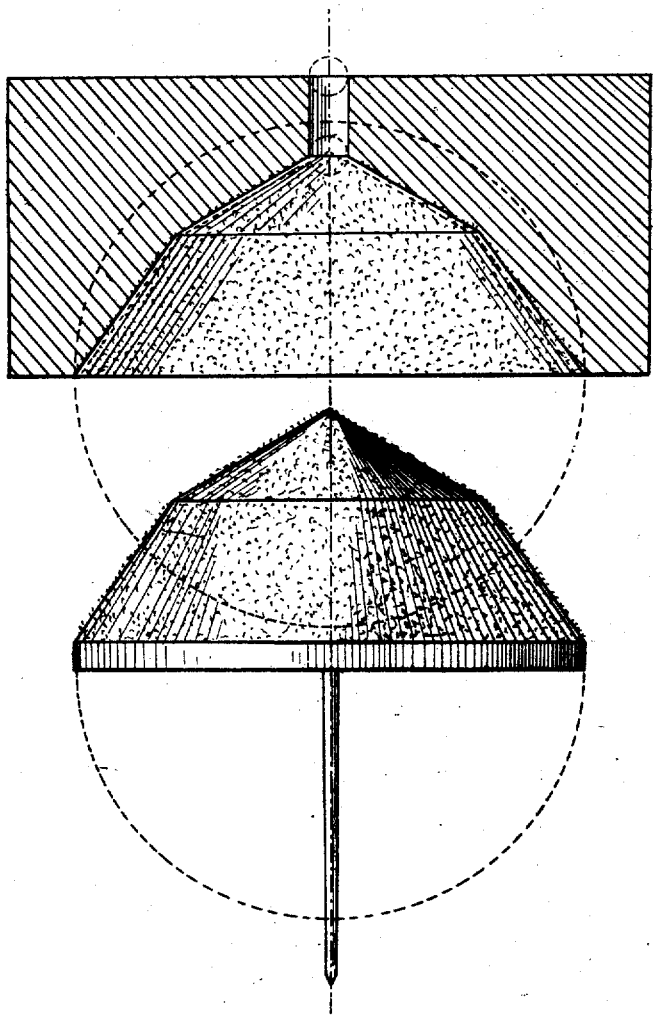
THE NORRIS PETERS CO., PHOTO-LITHO., WASHINGTON, D. C.

[illegible] 28/1831

Benjamin Myers Chambersburgh Penn. 6767X

Letters Patent

The Schedule referred to in these Letters Patent and making part of the same containing a description in the words of the said Benjamin Myers himself of his improvement in the mode of Constructing Mill Stones for Grinding grain hulling Clover seed &c.

Be it known that I Benjamin Myers of the town of Chambersburgh in the County of Franklin and State of Pennsylvania have made a new and useful improvement in the Construction of Mill Stones, which is described as follows.

The Runner is made of stone or other suitable material and is shaped somewhat conically It is about two feet in diameter at the bottom and slopes gradually towards the apex nine inches at an angle of about fifty five degrees From this point it slopes to the apex at an angle of about twenty degrees.

The Bed Stone is composed of the same material as the runner about two and a half feet in diameter, and fourteen inches thick It is Concave and in shape corresponding to that of the runner, having an opening or eye in its centre about six inches in diameter through which the grain or Clover seed passes to the Runner to be ground or hulled. The Bed stone is placed above the Runner on the frame of the Mill in the usual manner The Runner is secured to the spindle and hung horizontally and is graduated in the usual manner Both Bed Stone and Runner may be covered with sheet iron punched so as to form projections on their outer surfaces. Or they may have nails driven in their circumferences with their points projecting a sufficient distance. Or their outer surfaces may be rendered rough for hulling Clover seed in any convenient manner. This however I do not claim as my invention it having been known before.

But what I claim as my invention and wish to secure by Letters Patent is the form of the Bed Stone and Runner as before described. [illegible]

Witnesses
William P. Elliot
Eben J. [illegible]

Benjamin Myers (September 28. 1831.)

375